Dec. 30, 1941.  L. E. SPRAY  2,267,997
ADJUSTMENT OF SPECTACLES
Filed Jan. 5, 1939  2 Sheets-Sheet 1

INVENTOR
Lester E. Spray

Dec. 30, 1941.  L. E. SPRAY  2,267,997
ADJUSTMENT OF SPECTACLES
Filed Jan. 5, 1939  2 Sheets-Sheet 2

INVENTOR
Lester E. Spray

Patented Dec. 30, 1941

2,267,997

UNITED STATES PATENT OFFICE 2,267,997

ADJUSTMENT OF SPECTACLES

Lester E. Spray, Wilkinsburg, Pa.

Application January 5, 1939, Serial No. 249,471

6 Claims. (Cl. 88—48)

My invention relates to adjustment of spectacles, and particularly to adjustment of the elevation of spectacles with reference to the eyes of the wearer.

This application is a continuation-in-part of my earlier application for Letters Patent of the United States, Serial No. 87,754, filed June 27, 1936, for Adjustment of spectacles. Figures 1, 2, 3, 4, 5, 6, 7, 7a and 8 of the present application correspond to Figs. 1, 2, 3, 4, 5, 6, 7, 7a and 8, respectively, of the earlier application.

One feature of my invention is the provision of means for adjusting the elevation of bifocal spectacles for far and near vision. Another feature of my invention is the provision of means for raising, for other purposes, various types of spectacles from a first elevation to a higher elevation with relation to the eyes of the wearer.

I shall describe several forms of apparatus and a method embodying my invention, and shall then point out the novel features thereof in claims.

Figure 1:
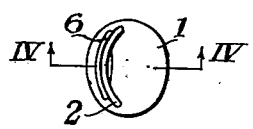
Figure 3:
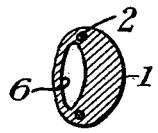
Figure 2:
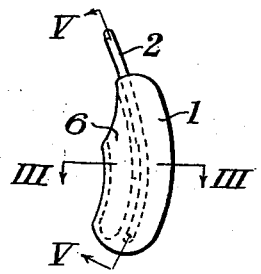
Figure 4:
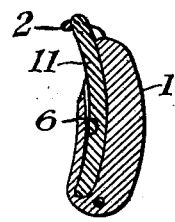
Figure 5:
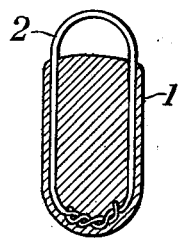
Figure 6:
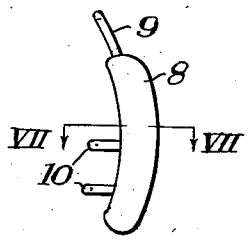
Figure 7:
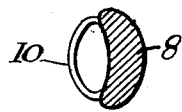
Figure 7A:
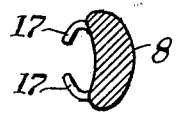
Figure 8:
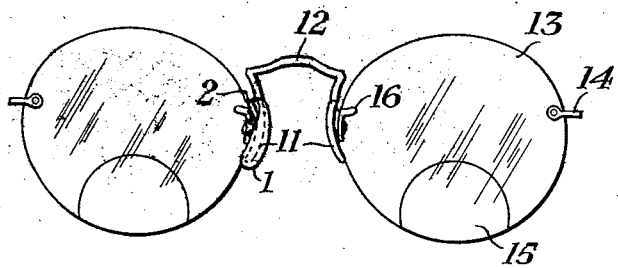
Figure 9:
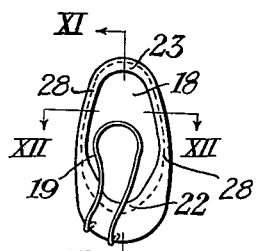
Figure 10:
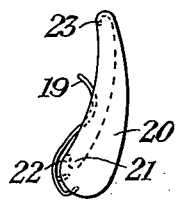
Figure 11:
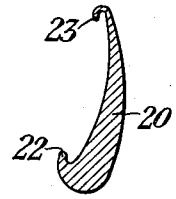
Figure 12:
Figure 12A:
Figure 13:
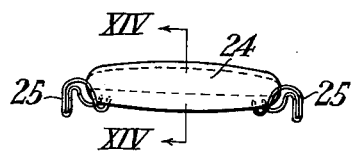
Figure 14:
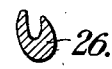
Figure 15:
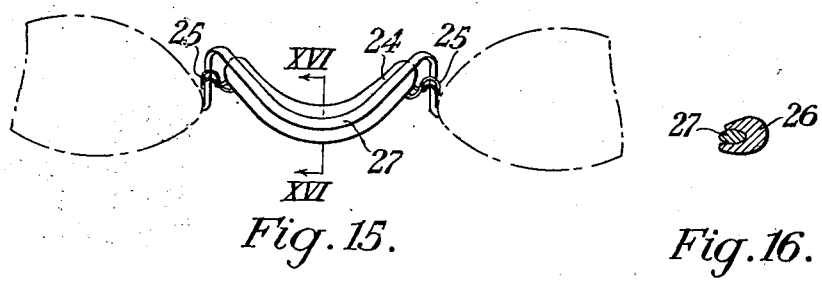
Figure 16:

In the accompanying drawings, Fig. 1 is an enlarged plan view of a removable auxiliary nose pad 1; Fig. 2 is an enlarged view in side elevation of the nose pad shown in Fig. 1; Fig. 3 is a view in horizontal section along the line III—III of Fig. 2; Fig. 4 is a view in vertical section along line IV—IV of Fig. 1 showing also application of a removable nose pad 1 to a usual or main nose pad 11; Fig. 5 is a view showing pad 1 in section along center line V—V of wire 2 in Fig. 2 and showing a full view of wire 2; Fig. 6 is an enlarged view in side elevation of a modified form of auxiliary removable nose pad; Fig. 7 is a view in horizontal section along the line VII—VII of Fig. 6; Fig. 7a is a view similar to Fig. 7, but of a modified form of the device shown in Fig. 6; Fig. 8 shows a pair of spectacles to which one of the auxiliary removable nose pads 1 is shown applied on one of the main nose pads 11; Fig. 9 is an enlarged back view of a modified form of auxiliary removable nose pad having a wedge shaped portion for use with spectacles of the type having a pair of main nose pads or rests; Fig. 10 is an enlarged view in side elevation of the nose pad 18 shown in Fig. 9; Fig. 11 is a view in vertical section of pad 18 along the line XI—XI of Fig. 9; Fig. 12 is a view in horizontal section along the line XII—XII of Fig. 9; Fig. 12a is a view similar to Fig. 12, but of a modified form of the pad shown in Fig. 9; Fig. 13 is an enlarged front view of a modified form of auxiliary removable nose pad for use with spectacles having bridge means contacting the top of the wearer's nose; Fig. 14 is a view in vertical section along the line XIV—XIV of Fig. 13; Fig. 15 is an enlarged top view showing the auxiliary removable nose pad of Fig. 13 applied to the bridge means of a pair of spectacles; and Fig. 16 is a view in vertical section of the pad and bridge means along the line XVI—XVI of Fig. 15.

Similar reference characters refer to similar parts in each of the views.

In each of the Figs. 1, 2, 3, 4, 5 and 8 of the drawings, a pad 1 is shown which may be formed of cloth, Celluloid, or other suitable material, from the upper end of which a loop of wire 2 projects. As here shown, wire 2 extends to the lower end of pad 1, where the ends of wire 2 may be twisted or soldered together. Other arrangements of wire 2 in pad 1 may, however, be employed. The materials commonly used in nose pads for spectacles may also be among the materials which are suitable for pad 1. Wire 2 may preferably be of a spring material, such, for example, as spring steel. A recess 6 is formed in pad 1 to receive a usual or main nose pad 11, shown in Figs. 4 and 8, which is usually irremovably attached to a bridge 12 through a curved piece 16.

Figs. 6 and 7 show a modified form of auxiliary removable nose pad comprising a pad 8, from which loops of wires 9 and 10 project. The form shown in Fig. 7a has a pad 8 and a wire loop 9 as shown in Fig. 6, but has hooks 17 instead of loops 10.

It may be found more convenient if the removable pads for each pair of spectacles are connected together in pairs by some means, such for example as a string, wire, or strip.

A method of adjusting a pair of bifocal spectacles for far and near vision consists of setting the spectacles, with respect to the main nose pads 11, so that the spectacles are at the proper elevation for far vision but are too low for comfortable or efficient near vision, and of applying removable nose pads, such as here shown, to the two main nose pads 11 to raise the spectacles while they are being used for near vision. The removable nose pad shown in Figs. 1, 2, 3, 4 and 5, is applied by an upward push so that a main nose pad 11 enters recess 6 of the removable nose pad as shown in Figs. 4 and 8. Wire loop 2 is then pushed over the upper end of main nose pads 11 for retaining the removable nose pad. In applying the nose pad shown in Figs. 6 and 7, loops 10 are pushed up over a main nose pad 11, and loop 9 is then pushed over the upper end of the main nose pad 11, similarly to the manner in which loop 2 of the device shown in Figs. 1, 2, 3, 4 and 5 is pushed over the upper end of the main nose pad 11. The device shown in Fig. 7a may be similarly applied by pushing hooks 17 up over a main nose pad 11 and then pushing loop 9 over the upper end of pad 11.

Figs. 9, 10 and 11 show a modified form of auxiliary removable nose pad means comprising a pad 18 equipped with a loop 19 which may be of a spring wire material. Nichrome wire has been used satisfactorily for loop 19. The purpose of the loop 19 is to retain the auxiliary removable pad 18 more securely on the irremovable pad or main nose rest 11, although an auxiliary removable pad of this type adheres fairly well to a main nose rest 11 without such retaining means. Instead of a loop 19, other retaining means, such for example as a flat strip, could be used.

Pad 18 may be made of a material such as zylonite or other materials commonly used in main nose rests 11.

Pad 18 has a curved wedge shaped portion 20, which, when the pad is in use, is between the nasal side of a main nose rest 11 and the wearer's nose, thereby serving to raise the spectacles with respect to the eyes of the wearer. Pad 18 also has a recess 21, at the lower end of which is a retaining portion 22, and at the upper end of which is a second retaining portion 23. The lateral edges of pad 18 along recess 21 may also have inwardly directed portions 28 between, and similar to, but probably narrower than, the retaining portions 22 and 23 as shown in Figs. 9, 12 and 12a. Pads 18 having a wedge shaped portion 20 with a thickness adjacent the lower end of the order of one-sixteenth inch, or slightly thicker, have been found to give good results for raising bifocal spectacles in order to bring the near seeing portion of the lenses into suitable position for near vision.

One manner of attaching loop 19 to pad 18 is by inserting the ends of loop 19 into the lower end of pad 18 as shown in Figs. 9 and 10. The ends of loop 19 may be equidistant from the vertical center line of pad 18 or they may be in some other location with respect to pad 18, as shown in Fig. 9, in order to render loop 19 less visible. With the ends of loop 19 located as shown in Fig. 9, the pad should therefore be used on the right-hand main nose rest 11. A pad 18 for use on the left-hand main nose rest 11 should then have the ends of loop 19 on the opposite side of the vertical center line of pad 18.

The portion 20 may be of practically uniform thickness in horizontal cross section as shown in Fig. 12, or it may be found preferable to make the portion 20 of less thickness near the top of the wearer's nose as shown in Fig. 12a.

In applying an auxiliary removable nose pad 18 to a main nose rest 11 of a pair of spectacles, the pad 18 is first pushed upward to receive the lower end of the main nose rest 11 in the recess 21 beneath the upper or free portion of loop 19. This upward movement of pad 18 is continued until the retaining portion 23 snaps over the upper end of the main nose rest 11. Pad 18 may then be pushed downward slightly.

In order to remove a pad 18 from a main nose rest 11, pad 18 may first be pushed upward, and then its upper end pushed away from the upper end of main nose rest 11. Pad 18 may then be pushed downward out of engagement with main nose rest 11.

Pads 1 and 18 can thus be easily applied to, and easily removed from, main nose rests 11. This characteristic is important, since a person may not be able to see clearly with his spectacles removed while applying or removing the pads 18. Another important characteristic of the pads 1 and 18 is that they are inconspicuous, or at least pleasing in appearance when in use on main nose rests 11.

Figs. 13, 14, 15 and 16 show a modified form of auxiliary removable nose pad means, for use with spectacles having main nose rest means such as bridge means contacting the top of the wearer's nose, comprising a pad 24 equipped with loops 25 for more securely retaining the pad 24 on the bridge means 27 of a pair of spectacles. Pad 24 has a wedge shaped portion 26 which is between the nasal side of bridge means 27 and the nose of the wearer when pad 24 is in use with a pair of spectacles. The thicker portion of the wedge 26 is at the lower portion of pad 24. Although pad 24 is shown having a wedge shaped portion 26, such a pad could have, instead, a corresponding portion of substantially uniform thickness of sufficient magnitude for raising a pair of bifocal spectacles from an elevation suitable for far vision, without the pad 24, to an elevation suitable for near vision when pad 24 is used with the spectacles as shown in Figs. 15 and 16. Pad 24 and loops 25 can be of materials similar to the materials suggested for pad 18 and loop 19, respectively, of Figs. 9, 10 and 11.

Dark glass attachments when applied to bifocal spectacles and also to other spectacles, such for example as for use in driving an automobile in bright sunlight, depress the spectacles to a lower elevation with respect to the eyes of the wearer. Auxiliary removable nose pads, such as herein shown and described, could be used in such instances to raise the spectacles from the depressed position to the normal elevation with relation to the eyes of the wearer.

I have found that if spectacles similar to those shown in Fig. 8 are positioned, with respect to the main nose pads 11, so that the near-seeing portions 15 of the lenses are low enough that they do not interfere while a wearer of the spectacles is walking along the street, the wearer cannot read comfortably at a desk without tilting the head backward. I have also found that if the spectacles are so positioned, with respect to the main nose pads 11, that the near-seeing portions 15 are in the proper position for comfortable and efficient near vision, they are not comfortable to the wearer while walking considerable distances. I have found too that, when driving an automobile, it is desirable to have the spectacles raised above the position which is suitable for walking considerable distances, in order to be able to comfortably read the instruments on the instrument board. From actual use of a nose pad constructed as shown in Figs. 1, 2, 3, 4, 5, 9, 10 and 11, I have found the adjustment of spectacles, which I have described, to be very satisfactory.

Although I have herein shown and described only a few forms of apparatus and one method embodying my invention, it is understood that various changes and modifications may be made therein within the scope of the appended claims without departing from the spirit and scope of my invention.

Having thus described my invention, what I claim is:

1. As an article of manufacture for use with spectacles having a pair of main nose rests for supporting said spectacles on the nose of the wearer, an auxiliary nose pad provided with a portion to engage the nasal side of one of said main nose rests and proportioned for raising said one main nose rest from a position for maintaining said spectacles at a suitable elevation for far vision to a position for maintaining said spectacles at a suitable elevation for near vision when the other one of said main nose rests is similarly raised, and means for retaining said auxiliary nose pad in detachable relationship to said one main nose rest.

2. As an article of manufacture for use with spectacles having a pair of main nose rests set to maintain said spectacles at a suitable elevation for distant vision, an auxiliary nose pad having a recess to receive a part of one of said main nose rests and provided with a portion to engage the nasal side of said one main nose rest, said portion being of sufficient thickness to elevate said one main nose rest to maintain the spectacles in a suitable position for near vision when the other one of said main nose rests is similarly elevated.

3. As an article of manufacture for use with spectacles having a pair of main nose rests set to maintain said spectacles at a suitable elevation for distant vision, an auxiliary nose pad provided with a portion to engage the nasal side of one of said main nose rests, said portion being of sufficient thickness to elevate said one main nose rest to maintain the spectacles in a suitable position for near vision when the other one of said main nose rests is similarly elevated, and loop means for retaining said auxiliary pad in detachable relationship to said one main nose rest.

4. As an article of manufacture for use with spectacles having a pair of main nose rests set to maintain said spectacles at a suitable elevation for distant vision, an auxiliary nose pad provided with a portion to engage the nasal side of one of said main nose rests, said portion being of sufficient thickness to elevate said one main nose rest to maintain the spectacles in a suitable position for near vision when the other one of said main nose rests is similarly elevated, and spring means for retaining said auxiliary pad in detachable relationship to said one main nose rest.

5. As an article of manufacture for use with spectacles having a pair of main nose rests for supporting said spectacles on the nose of the wearer, an auxiliary nose pad provided with a wedge shaped portion to be placed between the nasal side of one of said main nose rests and the nose of the wearer with the thicker portion of the wedge in the downward position and of sufficient thickness for raising said one main nose rest from a position for maintaining said spectacles at a suitable elevation for far vision to a position for maintaining said spectacles at a suitable elevation for near vision when the other one of said main nose rests is similarly raised, and means for retaining said auxiliary nose pad in detachable relationship to said one main nose rest.

6. Auxiliary nose pad means for use with spectacles having main nose rest means by which said spectacles without said auxiliary nose pad means are supported at a suitable elevation for far vision by engagement of said main nose rest means with the nose of the wearer, said auxiliary nose pad means provided with one side for engaging said main nose rest means and provided with an opposite side for engaging the nose of the wearer and having a given thickness between said one side and said opposite side for raising said main nose rest means from a position for maintaining said spectacles at a suitable elevation for far vision to a position for maintaining said spectacles at a suitable elevation for near vision with said one side engaging said main nose rest means and said opposite side engaging the nose of the wearer, and means for retaining said auxiliary nose pad means detachably in this relation to said main nose rest means whereby said auxiliary nose pad means is adapted to be readily and repeatedly attached daily to said main nose rest means to suitably elevate said spectacles whenever said spectacles are to be used for near vision and whereby said auxiliary nose pad means is adapted to be readily removed from said main nose rest means whenever said spectacles are to be used for far vision.

LESTER E. SPRAY.